No. 893,184. PATENTED JULY 14, 1908.
A. I. MERCER.
SAFETY VALVE STEM.
APPLICATION FILED MAY 13, 1907.

Inventor
Allen I. Mercer,

UNITED STATES PATENT OFFICE.

ALLEN I. MERCER, OF MANNINGTON, WEST VIRGINIA.

SAFETY VALVE-STEM.

No. 893,184.    Specification of Letters Patent.    Patented July 14, 1908.

Application filed May 13, 1907. Serial No. 373,479.

*To all whom it may concern:*

Be it known that I, ALLEN I. MERCER, citizen of the United States, residing at Mannington, in the county of Marion and State of West Virginia, have invented certain new and useful Improvements in Safety Valve-Stems, of which the following is a specification.

The present invention has for its object to provide novel means for preventing the casual turning of valves when adjusted to a given point, or the accidental opening or closing of the same by knocking or brushing against the handle or operating means.

The invention is particularly advantageous in connection with valves designed for use on stoves or heaters of various kinds using gas or liquid fuel, although it may be used wherever it is required to safe-guard a valve and prevent accidental operation thereof.

In accordance with this invention, the valve stem comprises two parts or members which normally are pressed apart by means of an interposed spring and catch between the members or parts, whereby upon properly directed force, the tension of the springs is overcome and the clutch elements brought together to admit of turning the valve stem as a whole to effect desired movement of the valve.

For a full description of the invention and the merits thereof and also to acquire a knowledge of the details of construction and the means for effecting the result, reference is to be had to the following description and accompanying drawings.

Figure 1:
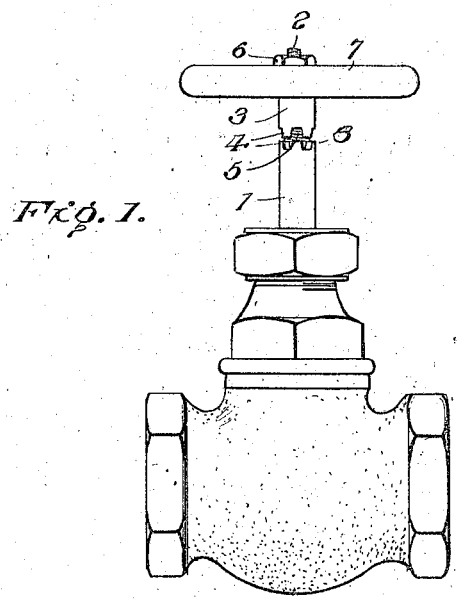
Figure 2:
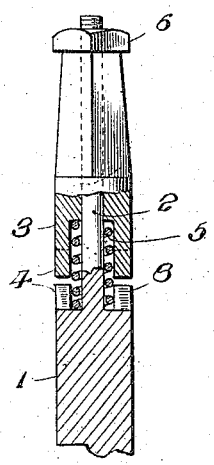
Figure 3:
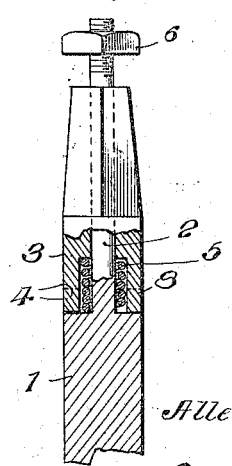

While the invention may be adapted to different forms and conditions by changes in the structure and minor details without departing from the spirit or essential features thereof, still the preferred embodiment is shown in the accompanying drawings, in which:

Figure 1 is a side view of a valve embodying the invention. Fig. 2 is a sectional view of the valve stem showing the parts held separated by the interposed spring. Fig. 3 is a view similar to Fig. 2 showing the parts of the stem pressed together to bring the clutch elements into engagement whereby the valve may be opened, closed or adjusted.

Corresponding and like parts are referred to in the following description and indicated in all the views of the drawings by the same reference characters.

The invention may be applied to any type of valve adapted to be actuated by rotating the stem. The stem of the valve comprises an inner member or section 1 and an outer member or section 3, said sections being movable longitudinally and having coöperating clutch elements 4 upon their meeting or opposing ends, whereby when the section or member 3 is pressed inward towards the member or section 1, the clutch elements or teeth 4 are caused to interlock so that the stem as a whole may be rotated either to the right or to the left to open, close or move the valve to any required point for proper control of the fluid passing therethrough. The two sections or members 1 and 3 are connected by means of a rod 2 which may form a part of the member 1, or be secured thereto in any manner. The member or section 3 is loose upon the rod or connection 2 so as to receive both a longitudinal and a rotary movement. The operating handle 7 is fitted to the outer end of the section or member 3. A spring 5 is interposed between the members 1 and 3 and normally exerts a pressure to force them apart so as to hold the clutch 8 or elements 4 separated, whereby the outer section 3 provided with the operating handle 7 may turn freely without effecting movement of the valve either to open, to close or move the same from an adjusted position. The ends of the spring 5 are seated in recesses formed in the opposing ends of the members 1 and 3. The rod or connection 2 projects beyond the outer end of the member 3 and is threaded to receive a set nut 6. If required, the member 3 may be pressed inward towards the member 1 and held in place with the clutch teeth 4 interlocked by turning the set nut 6 upon the threaded end of the rod or connection 2. To prevent accidental movement of the valve, the set nut 6 is adjusted upon the rod 2 to permit the spring 5 to force the member 3 upward and hold the clutch teeth or elements 4 out of engagement, hence should the handle be turned accidentally either by striking or brushing against the same, the position of the valve will not be changed since said handle turns freely without producing any movement of the main portion of the stem 1 which operates the valve.

Having thus described the invention, what is claimed as new is:

A valve stem comprising an inner member having its outer end portion reduced to form a rod whose outer extremity is threaded, the end portion at the base of the rod being recessed and the wall surrounding said recess having its outer end notched to form teeth, an outer member slipped upon said rod and having its inner end recessed and the extremity of the wall surrounding said recess notched to provide teeth to interlock with the teeth of the inner member, a spring mounted upon the inner portion of said rod and seated at its ends in the recesses formed in the opposing ends of the two members, and a set nut mounted upon the threaded end of the said rod.

In testimony whereof I affix my signature in presence of two witnesses.

ALLEN I. MERCER. [L. S.]

Witnesses:
 ALONZO PRICE,
 C. E. HAWKENBERRY.